US012809755B2

(12) United States Patent
Gaumnitz et al.

(10) Patent No.: US 12,809,755 B2
(45) Date of Patent: Nov. 24, 2026

(54) TEST LOAD DISTRIBUTION OVER LANDSCAPE TYPES IN A CLOUD INFRASTRUCTURE

(71) Applicant: SAP SE, Walldorf (DE)

(72) Inventors: Gordon Gaumnitz, Wiesloch (DE); Sebastian Stopp, Berlin (DE)

(73) Assignee: SAP SE, Walldorf (DE)

( * ) Notice: Subject to any disclaimer, the term of this patent is extended or adjusted under 35 U.S.C. 154(b) by 369 days.

(21) Appl. No.: 18/474,412

(22) Filed: Sep. 26, 2023

(65) Prior Publication Data

US 2025/0103472 A1 Mar. 27, 2025

(51) Int. Cl.
*G06F 9/44* (2018.01)
*G06F 11/3668* (2025.01)

(52) U.S. Cl.
CPC ........ *G06F 11/3688* (2013.01); *G06F 11/368* (2013.01)

(58) Field of Classification Search
None
See application file for complete search history.

(56) References Cited

U.S. PATENT DOCUMENTS

| | | | |
|---|---|---|---|
| 8,276,123 B1 | 9/2012 | Deng et al. | |
| 10,002,067 B2 * | 6/2018 | Tharippala | H04L 67/10 |
| 10,430,319 B1 | 10/2019 | Tokappa et al. | |
| 10,922,216 B1 | 2/2021 | Kumar et al. | |
| 11,438,437 B1 * | 9/2022 | Eberlein | G06N 5/04 |
| 12,386,728 B2 | 8/2025 | Zhan | |
| 2008/0244522 A1 | 10/2008 | Bernin | |
| 2011/0219359 A1 | 9/2011 | Gupta | |
| 2017/0116112 A1 * | 4/2017 | Vainer | G06F 11/3688 |
| 2019/0156199 A1 | 5/2019 | Reeve et al. | |
| 2019/0179731 A1 * | 6/2019 | V | G06F 11/3684 |
| 2019/0294531 A1 | 9/2019 | Avisror et al. | |
| 2019/0294536 A1 | 9/2019 | Avisror et al. | |
| 2020/0097390 A1 | 3/2020 | Gunter | |

(Continued)

OTHER PUBLICATIONS

Bach et al., "Testing Very Large Database Management Systems: The Case of SAP HANA" Datenbank-Spektrum 22.3, Nov. 2022, 22(3):195-215.

(Continued)

*Primary Examiner* — Lanny N Ung
(74) *Attorney, Agent, or Firm* — Fish & Richardson P.C.

(57) ABSTRACT

The present disclosure relates to computer-implemented methods, software, and systems for implementing selection and distribution of tests to run over microservices executed on various infrastructure landscape types. A set of products that include microservices to be tested is determined. A set of infrastructure landscape types are determined for test executions for each respective product so that each type is associated with a predefined probability of selection from each set corresponding to each product. For each iteration of a schedule of iterations for test executions for a respective product over a period of time, a respective infrastructure landscape type from a respective set of infrastructure landscape types for hosting each product from the set of products is selected, and a test from the set is executed over the respective product when the product is running on a selected infrastructure landscape type according to the selection.

18 Claims, 7 Drawing Sheets

(56) References Cited

U.S. PATENT DOCUMENTS

| | | | |
|---|---|---|---|
| 2022/0179639 | A1 | 6/2022 | Manley |
| 2022/0269582 | A1 | 8/2022 | Spiro et al. |
| 2022/0414577 | A1* | 12/2022 | Patel ................ G06Q 10/06312 |
| 2025/0103463 | A1 | 3/2025 | Gaumnitz et al. |
| 2025/0342034 | A1 | 11/2025 | Lake |

OTHER PUBLICATIONS

U.S. Appl. No. 18/474,417, Gaumnitz et al., Test Framework Supporting Precise Selection of Tests for Microservice in a Cloud Environment, filed Sep. 26, 2023, 41 pages.
Extended European Search Report in European Appln. No. 24193470.2, mailed on Jan. 2, 2025, 10 pages.
Final Office Action in U.S. Appl. No. 18/474,417, mailed on Nov. 26, 2025, 22 pages.
Non-Final Office Action in U.S. Appl. No. 18/474,417, mailed on Jun. 17, 2025, 21 pages.

* cited by examiner

TEST LOAD DISTRIBUTION OVER LANDSCAPE TYPES IN A CLOUD INFRASTRUCTURE

TECHNICAL FIELD

The present disclosure relates to computer-implemented methods, software, and systems for managing the design and testing of software solutions.

BACKGROUND

Software complexity is increasing and causes changes to the lifecycle management and maintenance of software applications, databases, and platform systems. In software development, testing usually is associated with complicated systems and solutions that require time and resources to ensure high quality results. Usually, quality engineers are supposed to test complicated software solutions with a great variety of combinations of included components that are integrated in different ways.

SUMMARY

Implementations of the present disclosure are generally directed to a computer-implemented method for the selection of tests for execution over microservices in a cloud environment.

One example method may include operations such as: determining a set of products to be tested, wherein each product comprises a set of microservices, wherein the set of microservices is deployed on a cloud infrastructure landscape; determining a set of infrastructure landscape types for test executions for each respective product of the set of products, wherein each type is associated with a predefined probability of selection from each set corresponding to each product; and for each iteration of a schedule of iterations for test executions for a respective product of the set of products over a period of time: selecting, based on the predefined probability of selection, a respective infrastructure landscape type from a respective set of infrastructure landscape types for hosting each product from the set of products to run a respective set of tests during the iteration, wherein the selected infrastructure landscape type is bound to the respective product for the respective test iteration, and executing a test from a set of tests, wherein the test is executed over the respective product from the set of products when the product is running on a selected infrastructure landscape type according to a selection based on the predefined probability of selection for the infrastructure landscape types.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description, drawings, and claims.

DETAILED DESCRIPTION

Figure 1:
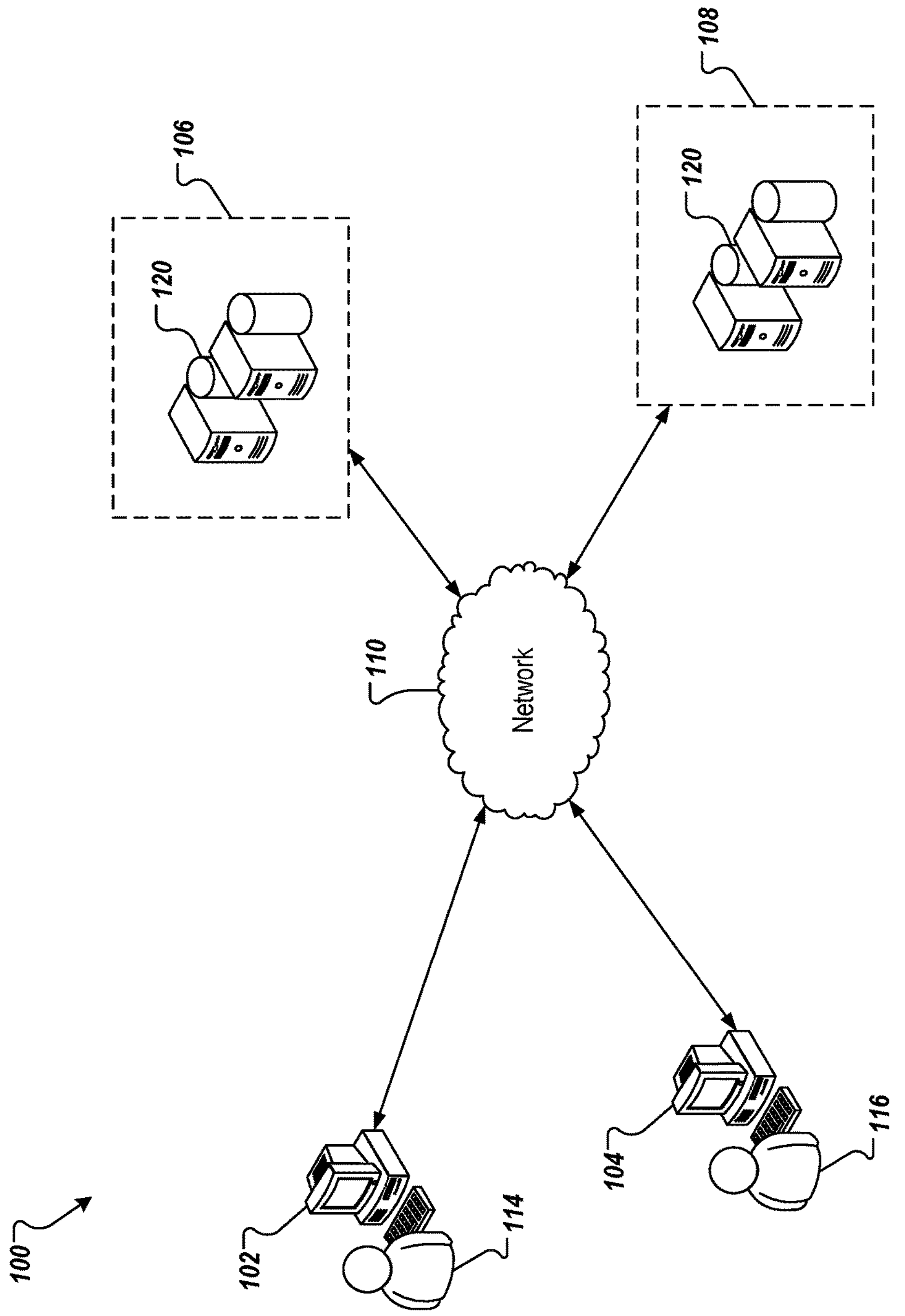
FIG. 1 is a block diagram depicting an example computer-implemented system that can execute implementations of the present disclosure in accordance with implementations of the present disclosure.

The present disclosure describes various tools and techniques for implementing the selection and distribution of tests to run over microservices executed on temporary landscapes of various infrastructure landscape types.

In some implementations, a landscape can be defined as a set of clusters (e.g., Kubernetes clusters) wherein each cluster can be associated with a type. In some instances, a cluster type may provide a defined set of services. For example, a cluster can be product specific and include micro services and generic services used in the product. In another example, some clusters (e.g., general clusters) can host only services for general use that may not be tied to a product but may be used by product specific features (as implemented in other clusters). In such instances, one service from one cluster may invoke commands to be executed into other clusters (e.g., thus having the actions be executed at separate clusters). Such remote commands that request the actions are executed "externally" from a particular invoking cluster may be slower and may provide less options to be controlled with regard to security and scalability. Thus, in some cases, one cluster may combine services that are product specific and generic to improve the performance of the services. For example, log handling is quite an intensive operation when it comes to throughput and the outbound network throughput is a significant cost factor, thus, logging services can be installed into every product cluster to reduce resource expenditures.

Software testing is an established activity in the software development process that ensures and improves the quality of a software product. When testing is executed, a set of tests can be defined and configured based on the specifics of the software project. In some implementations, a software project can combine multiple software components (e.g., services or microservices) to run together and provide resources to customers. In some cases, an existing software project can be modified, for example, source code can be changed. Such changes to a software project may be automatically and dynamically associated with the initiation of a test plan. In some implementations, a modification to a portion of a software project may not require that all available tests for the project are executed. In some instances, such execution may be overly time-consuming, resource-intensive, and unnecessary for resolving or identifying issues.

In some implementations, if a production system is to be tested in a fully automated manner or in a substantially fully automated manner, a copy of the production system can be made, which can be done in smaller copies to avoid outages or data loss. Setting up tests for full-scale product testing can be resource-intensive and may require a significant amount of time to prepare testing effort, and computational resources to execute. Therefore, there is a need to minimize or at least reduce the testing effort to a meaningful set of testing operations that can yield good results when identifying issues related to changes made to software projects.

In accordance with implementations of the present disclosure, when changes are made to a software product, metadata associated with the changes can be created, e.g., at the source code repository storing the code for the software product. The metadata can be evaluated based on an implemented rule set to determine which portions of the software project are to be tested and to identify tests associated with the changes made.

In some implementations, an overall pipeline with tests including landscape creation, instance provisioning, landscape upgrade, tests of landscape and instances, instance de-provisioning, and landscape deletion in the correct order can be defined.

The pipeline can be used to determine which tests are relevant or which tests can be skipped from execution based on a notified change for the product or service. In some implementations, a testing framework can be defined that includes rules. When used, these rules can automatically decide which tests to skip based on default setting for interpreting flags added to changes (e.g., flags can be added by users modifying the source code, by automatically executed changes provided by a system, or otherwise), situation rules, and/or additional user provided instruction to execute a test (e.g., to overrule automatic decision or redefine decisions by automatic rules (e.g., by setting additional flags for the changes that were made)). In some instances, the test pipeline can be structured in a sequential initialization and unit test part and a parallelized integration test part, where several landscape setups are tested in parallel. Each tested landscape setup in the integration test phase can execute the defined pipeline flow including landscape creation, tests, and deletion.

In accordance with implementations of the present disclosure, components of a software product or respective software products are defined as relevant for testing, and a set of tests for each tested unit are identified. The components can be tested when they run on various infrastructure landscape types. For example, landscapes can be classified into different types based on their infrastructure provider for the landscape, geographical location of the landscape, cluster types deployed at the landscape, or sizing, among other examples. In some instances, some landscape types can be associated with issues that could not be identified if the components run on another landscape type (e.g., different landscapes associated with different infrastructure providers and/or hosting clusters of different types). The distribution of components (e.g., services or products) over landscape types can be performed based on a distribution logic that relies on assigning an entity to be tested to a particular landscape type for each given time period when tests are scheduled. For example, a selector for a landscape type per service or product can be defined for a time period such as a month, day, week, set number of hours, or the like.

The present implementations support automatic detection of changes in the files of a software project and adjustment to the test strategy to define less or more testing depending on the changed content of the files. The selection logic for tests over particular portions of a software project can allow precise testing of changed systems without running tests of non-changed portions of the software project, which is more efficient and saves costs. The test execution can be spread over different landscape types which support accurate testing while reducing testing costs. For example, using a testing framework as described in the present disclosure can support the distribution of test workload onto different infrastructure providers (e.g., infrastructure as a service such as a hyperscaler or other infrastructure provider). For example, most of the microservices do not have any hyperscaler specific implementations and can be tested on any cloud infrastructure provided by a given provider such as Amazon Web Services (AWS), Microsoft Azure, Google Cloud Platform (GCP), etc. The present distribution logic supports efficient workload distribution of microservices over different infrastructure providers. That can lead to cost- and time-effective distribution of test runs while still covering all providers in database infrastructure tests.

In some instances, a landscape including stateless microservices may provide options to include new versions of existing microservices deviating, even if only minimally, from currently active services. For example, a web service that receives traffic can be modified to generate a new version for which one can route 1% of the traffic to the new version of the web service while keeping 99% of the traffic to the current stable version of the web service. If such splitting of traffic raises alerts, increases failure rates, or any other issue can be detected, it can be possible to terminate the new version of the system. In such cases, 1% of the requests might fail, but if clients retry to request services, they will receive a valid response from the current stable version of the web service. Defining such a new version of a web service and using it in a productive scenario can be an inexpensive test setup that has no extra hardware costs for tests. However, such testing scenarios may not be applicable to stateful services, such as DBMS with a persistency backend. In those cases, if we would use 1% of the database instances with a new microservice version and if that one instance fails and corrupts the persistency of this 1% of the instances, then data can be irreversibly lost.

In some instances, when stateful services are tested, testing techniques can be executed before any actual productive use of the services and a smaller version of the entire production system can be created. Such replication of the production system can be costly and thus techniques to define a portion of the productive landscape that is relevant for the testing can be used so that only those aspects of the system that are relevant for the testing can be defined in hardware setups (size and amount) and/or test executions (e.g., usage time). Such hardware setups can be defined to allow estimation of the performance of the change. The costs would be different based on the size of the setup, the number of instances, and the time for executing the tests (and maintaining the setup). The larger the required hardware needs to be used, or the longer it is needed for testing, the more costs would be incurred for the test setup. By using techniques of the present disclosure, a hardware setup is determined that is usable for the testing and can provide accurate test evaluation results, while minimizing the costs for the test execution.

In software development, an application's development lifecycle includes various stages where development and testing stages can be performed iteratively two or more times to verify and potentially improve the quality of the final product. In some cases, FIG. 1 is a block diagram depicting an example computer-implemented system 100 that can execute implementations of the present disclosure in accordance with implementations of the present disclosure. In the depicted example, the example system 100 includes a client device 102, a client device 104, a network 110, a computing environment 106, and a computing environment 108. The computing environment(s) 106 and/or 108 can be cloud computing environments that can include one or more server devices and databases (for example, processors, and memory). In the depicted example, a user 114 interacts with the client device 102, and a user 116 interacts with the client device 104.

In some examples, the client device 102 and/or the client device 104 can communicate with the environment 106 and/or environment 108 over the network 110. The client device 102 can include any appropriate type of computing device, for example, a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 110 can include a large computer network, such as a local area network (LAN), a wide area network (WAN), the Internet, a cellular network, a telephone network (for example, PSTN), or an appropriate combination thereof connecting any number of communication devices, mobile computing devices, fixed computing devices and server systems.

In some implementations, the environment 106 (and/or the environment 108) can include at least one server and at least one data store 120. In the example of FIG. 1, the environment 106 is intended to represent various forms of servers including, but not limited to, a web server, an application server, a proxy server, a network server, and/or a server pool. In general, server systems accept requests for application services and provide such services to any number of client devices (for example, the client device 102 over the network 110).

In accordance with implementations of the present disclosure, and as noted above, the environments 106 and/or the environment 108 can host applications and databases running on the host infrastructure. In some instances, the environment 106 can include multiple cluster nodes that can represent physical or virtual machines that can represent web node clusters. A hosted application and/or service can run on virtual machines (VMs) hosted on cloud infrastructure.

In some instances, the environment 106 and/or the environment 108 can provide infrastructure for hosting a data processing application that can be tested and further developed (e.g., in cases where testing is defined as part of the development, or the testing phase can provide input for further development tasks) in accordance with the present disclosure.

In some instances, the environments 106 or 108 can host a testing framework and can support the instantiation of testing landscapes of various infrastructure landscape types such as those described in relation to FIGS. 2A, 2B, 2C, 3, and 4.

Figure 2A:
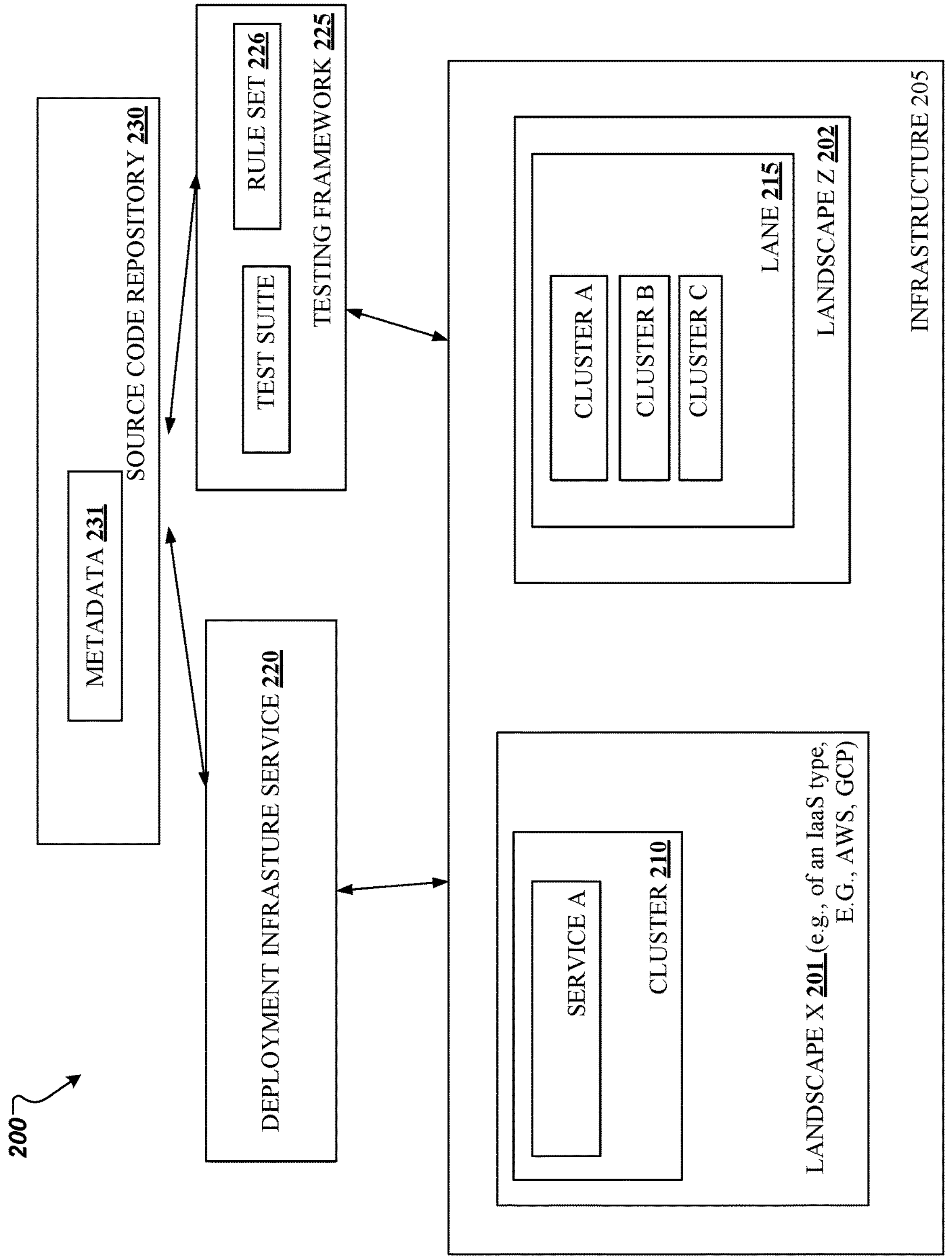
FIG. 2A is a block diagram of an example computing environment including a testing framework implementing rules for the selection of tests for execution over services running in clusters on a cloud infrastructure in accordance with implementations of the present disclosure.

FIG. 2A is a block diagram of an example computing environment 200 including a testing framework 225 implementing rules for the selection of tests for execution over services running in clusters on a cloud infrastructure in accordance with implementations of the present disclosure.

The computing environment 200 includes an infrastructure 205 that can include multiple landscapes that provide infrastructure as a service for running services in clusters. In some implementations, a landscape such as landscape X 201 can be defined as an infrastructure landscape of a given type related to the infrastructure provider such as AWS, GCP, Microsoft Azure, etc. Multiple services such as service A can run on the landscape X 201. For example, the services on the landscape X 201 can run in clusters, such as cluster 210 (e.g., a Kubernetes cluster) that supports deployment, scaling, and management of containerized applications. For example, the cluster 210 can allow containers to run across multiple machines and environments (e.g., virtual, physical, cloud-based, or on-premises). In some instances, the clusters running on a landscape may not be restricted to a specific operating system and can share operating systems and run without restrictions. The computer environment 200 includes a landscape Z 202 which is a different infrastructure landscape compared to the landscape X 201. The landscape Z 202 can include clusters, where each cluster can be associated with a different stage of software development of a software project. In some implementations, the landscape Z 202 can define lanes, where a lane such as lane 215 can be associated with a single software product (e.g., SAP HANA). A defined lane such as the lane 215, can include multiple clusters. In some implementations, one or more lanes may be defined when defining a testing flow of a landscape (e.g., of a particular landscape type), where each lane may map to a different development stage, i.e., development, test, and production. A defined lane, such as lane 215 can point out to respective landscape type(s), where the functionality provided by the clusters can be tested over different infrastructures. For example, the lane 215 can be a lane associated with a European region of a cloud offered services that can point out to use a landscape type associated with the European region for use in temporary use cases where testing can be executed.

In some instances, more landscapes can be defined on the infrastructure 205 where services can run in clusters and over lanes based on custom definitions.

In some implementations, the infrastructure 205 is a setup, which involves deployment, configuration, and management by a deployment infrastructure service 220. In some instances, requests for the instantiation of new services at one or more landscapes on the infrastructure 205 can be received and processed by the deployment infrastructure service 220. In some implementations, a testing framework 225 can be defined in relation to the infrastructure 205 and to software products that can run on top of the infrastructure 205. In some implementations, the software products can be defined as components and services that can interact to provide resources to end users. The software products can be deployed based on compiling (or not) source code stored at a source code repository 230.

In some implementations, a software project can be created at the source code repository 230 (e.g., Git) where the initial source code for a project can be stored and further subsequent code changes can be made. For example, changes can be made to existing source code to modify the functionality of the software product when deployed and running at the infrastructure 205. In some implementations, when a change is made to the source code of a software project, one or more files can be changed. The changes done to the source code (and to metadata) of the software project can be automatically identified by the source code repository 230 to trigger a testing workflow through the testing framework 225. In some instances, the testing framework 225 can include a test suite with pre-submitted tests that are associated with software projects created at the source code repository 230 and/or software products (deployed software projects) at the infrastructure 205.

In some implementations, the testing framework 225 can include a rule set 226 that defines rules to evaluate metadata (e.g., metadata 231) associated with changes to portions of a software product. The testing framework 225 can include logic to select at least some of the test parts of a default test plan for the software product to be executed at a testing landscape as described in FIG. 2B. The evaluation and determination of the tests and relevant portions of the software product can be executed at the testing framework 225 as described in method 300 of FIG. 3. The rule set 226 can include rules that map flags provided as metadata for changes related to a software product with respective actions or selection of tests relevant for the respective flag (and change).

Figure 2B:
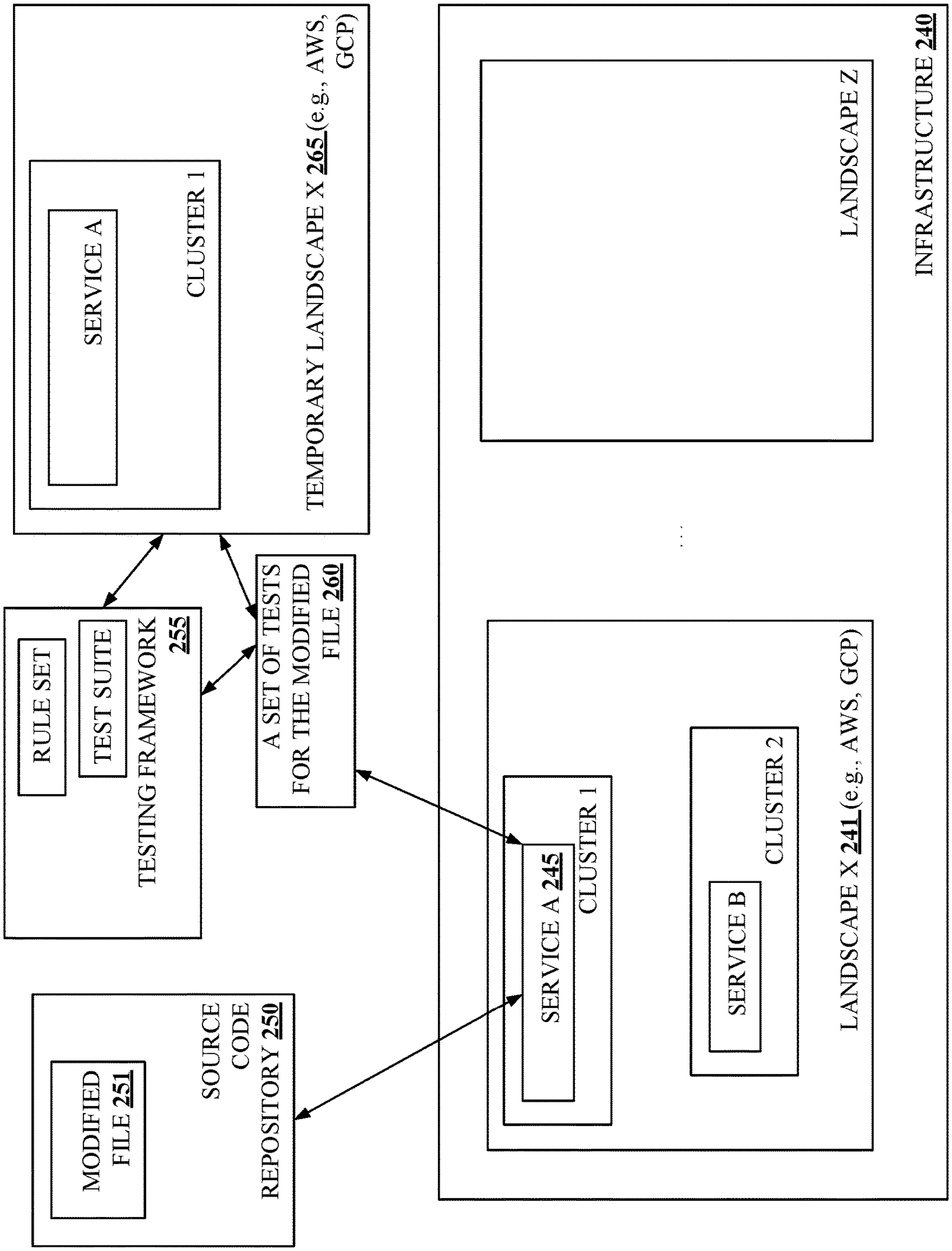
FIG. 2B is a block diagram of an example computing environment where selected tests for services are executed in a temporary testing landscape in accordance with implementations of the present disclosure.

FIG. 2B is a block diagram of an example computing environment where selected tests for services are executed in a temporary landscape in accordance with implementations of the present disclosure.

The computer environment of FIG. 2B can be substantially similar to the environment of FIG. 2A, where the infrastructure 240 can be similar to the infrastructure 205 of FIG. 2A. In some instances, the landscape X 241 can be defined to be a landscape of a landscape type such as AWS, where clusters are defined to run microservices on hyperscalers.

Figure 3:
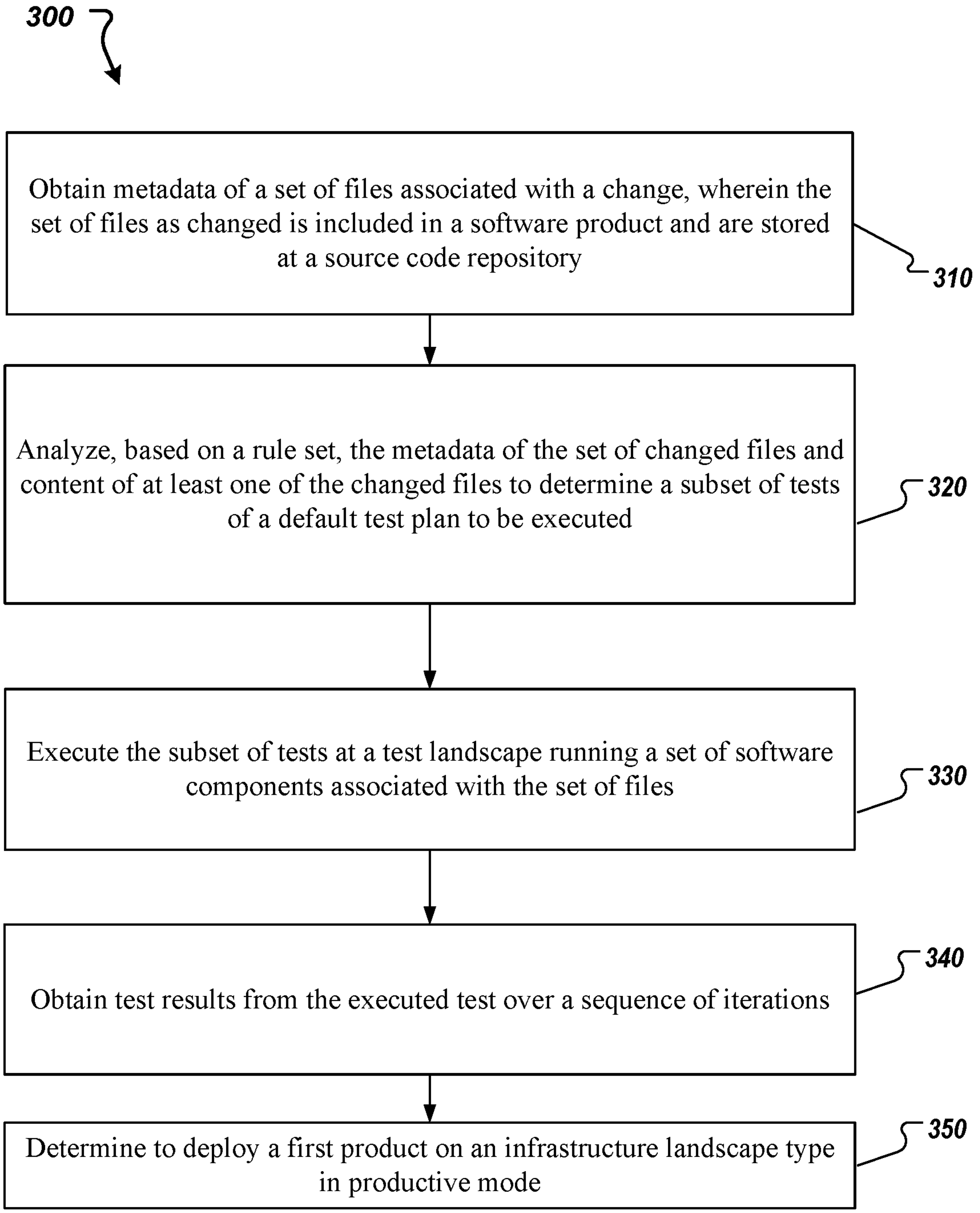
FIG. 3 is a flow diagram of a method for selection of tests for execution over services running in clusters on a cloud infrastructure in accordance with implementations of the present disclosure.

In some implementations, a source code file can be modified (to generate a modified file 251) at the source code repository 250, where upon receipt of the modification, the source code repository 250 can trigger a test flow, where a testing framework can identify metadata associated with the modification made at the source code repository 250 for the file 215 to use the rule set (similar or substantially similar to the rule set of FIGS. 2A and 3). Based on evaluation of the metadata, it can be determined that service A 245 is the service associated with the modified file 251 and that a set of tests 260 are relevant for the modification. The set of tests 260 can be defined as relevant for testing as described below in relation to FIG. 3. The set of tests 260 are executed over a test landscape that is instantiated as a temporary landscape 265 to match the landscape X 241 (e.g., to match the type of the landscape type, or configurations or constraints of the infrastructure). The identified service A 245 can run at the temporary landscape X 265 where the set of tests 260 can be executed, and test results can be obtained at the testing framework 255. In some implementations, the temporary landscape X 265 can include services in their version before the change was made (i.e., match the landscape X 241), where the temporary landscape X 265 can be updated to include the changes (e.g., the changes from the modified file 251). In other implementations, the temporary landscape X 265 can be directly created with the new service version including the changes from the modified file 251 so that the temporary landscape X 265 would be an updated version of the landscape 241 in view of the changes in the modified file 251. In some instances, the temporary landscape X 265 may differ further from the landscape 241 in sizing.

Figure 2C:
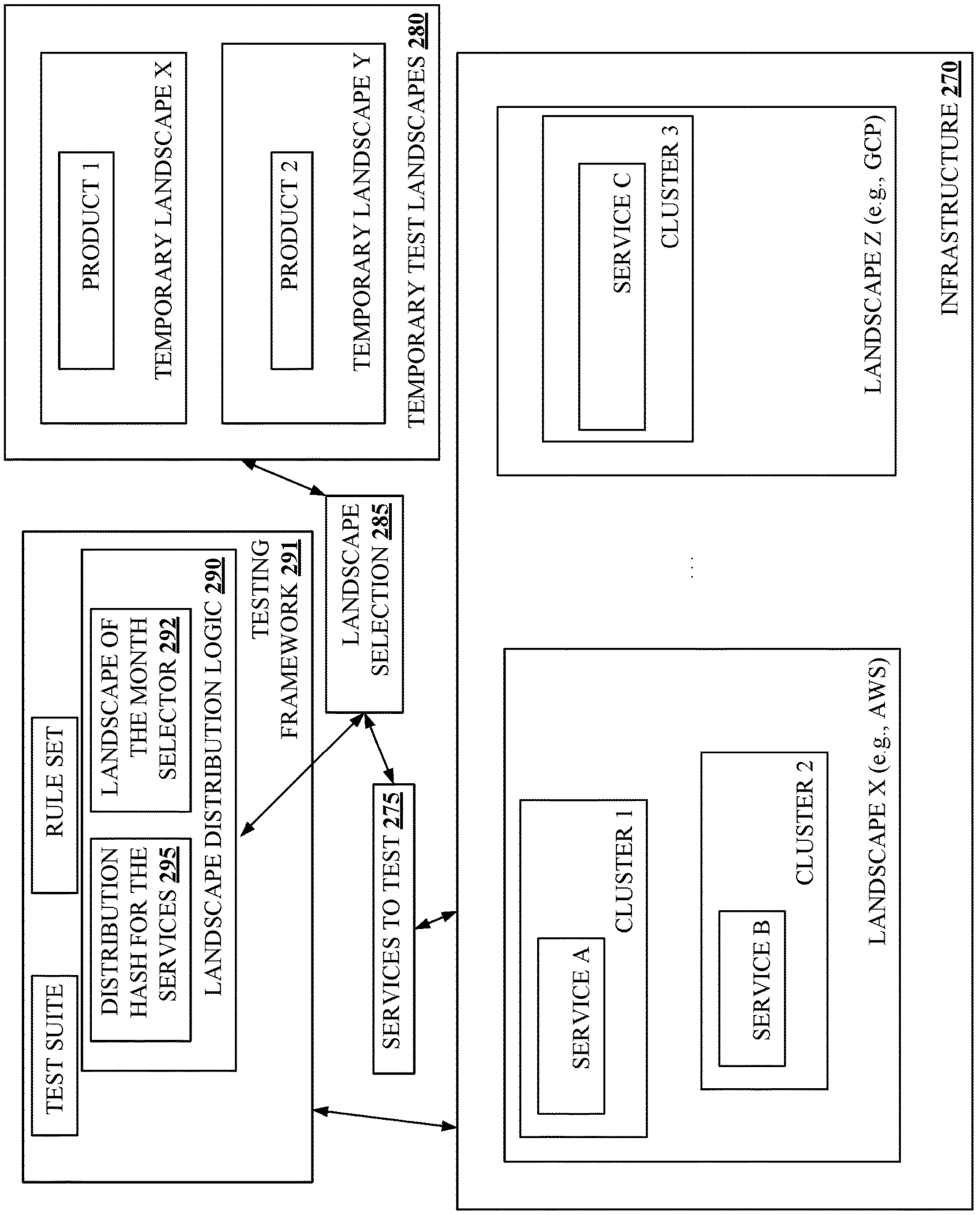
FIG. 2C is a block diagram of an example computing environment where a load of tests is distributed for execution over landscapes of different types in a temporary test landscape in accordance with implementations of the present disclosure.

FIG. 2C is a block diagram of an example computing environment where a load of tests is distributed for execution over landscapes of different types in a temporary test landscape in accordance with implementations of the present disclosure. The computing environment of FIG. 2C comprises landscapes of different landscape types as described for the infrastructure 205 of FIG. 2A and infrastructure 240 of FIG. 2B.

In some implementations, the computing environment of FIG. 2C includes the infrastructure of FIG. 2A and/or FIG. 2B, where the testing framework 291 can include a test suite and rule set substantially similar to those of FIGS. 2A, 2B, and 3. The testing framework 291 can include a landscape distribution logic 290. The distribution logic 290 can correspond to the logic that is used for executing the method 400 of FIG. 4 to determine how to select a landscape type to execute a given test for a given service or components. The distribution of tests for services over various types of infrastructure landscaper and over time can be performed in a manner that considers the load of the infrastructures (e.g., prevent overloading of an infrastructure landscape of a particular type) and saves resources for test execution while at the same time maintain the accuracy of the test results over time.

In some implementations, based on initiation of a test execution (e.g., based on the identification of a change in the source code of a software product including one or more microservices), a set 275 of services to be tested can be determined, where the set is of services are evaluated by the testing framework to determine where to distribute the set of services 275 so that those services are instantiated in a testing environment to execute the tests. In some implementations, the testing framework 291 of FIG. 2C can be substantially similar to the testing frameworks described in FIGS. 2A and 2B. The testing framework 291 can include logic to distribute services that are to be tested over landscapes of different types as described in relation to FIG. 4. In some implementations, a landscape distribution logic 290 of the testing framework 291 can be configured to execute the method 400 of FIG. 4. The landscape distribution logic 290 can include a hash 295 to store distribution of services from the services 275 determined to be tested that are mapped with a landscape of a landscape type. The distribution can be performed for discrete periods of time, for example, every day, week, or month, where a test executed within a given period (or iteration of a schedule with periods) for a given service can be selected as associated with a given landscape type. The selection for the landscape type can be done based on a predefined probability for the selection of each of the different landscape types that are supported for executing testing. The selection of a landscape type per service can be performed by the selector 292 as part of the landscape distribution logic 290 of the testing framework.

In some implementations, a mechanism to select a landscape type for a particular time period over a schedule for executing tests can be implemented to reduce testing costs by giving the ability to define a set of flags for the different types of landscapes, where one flag can be selected for each period of time, e.g., for every month for a specific service or product. The selection of a landscape type can be consistent for each individual month and service, where the selection of a landscape type can be bound to the service(s) names (e.g., individually or as a combination of services) and/or other identifier of a given service. In some cases, if multiple services are changed in a single pull request with received changes from a source code repository, each lane associated with a respective landscape type at a temporary landscape instantiated for testing would be used.

In some implementations, one landscape type from a set of available landscape types can be selected per service, so that each service can be mapped to a different landscape type. Such mapping between a landscape type and a service can be rotated over defined periods, such as months or other scheduled periods. The distribution of the selection for a landscape type for a service can be performed in consideration with ratios of distribution between different infrastructure providers. For example, landscapes associated with lower costs (e.g., cheaper infrastructures in the context of resources to instantiate and/or maintain) can be tasked with executing more tests compared to higher cost landscapes.

In some implementations, a service can define additional flags to indicate that certain infrastructure landscape types should be excluded from the selection for the service. For example, landscape types such as GCP can be defined as the only infrastructure provider that can be selected for services that are configured as GCP-only services, thus any other landscape type that could be used for the testing can be excluded.

In some instances, lanes can be defined in a similar manner as the landscapes of different types and can be used for defining testing flows with temporary lanes that substantially correspond to the temporary landscapes as discussed herein.

For example, if services A, B, and C need to be validated that they work as expected on landscape types X, Y, and Z, testing can be configured to include testing of service A on landscape X, service B on landscape Y, and service C on landscape Z. The configuration for testing can be defined for a set period of time. For a subsequent period (e.g., a month), the mapping between services and landscapes can be modified (or re-shuffled). In some examples, a service can be tested at a particular landscape type as long as there are three services running at the landscape type that are generally independent from the specific landscape type (e.g., not defined as a landscape specific service). By defining mappings (or assignments) of services to landscape types, the number of tests that are executed. For example, by defining that a service can run on a landscape with three other independent landscape services, the number of tests to complete a test scope "service x landscape" from 9 services is reduced to "one per service" of 3 services. The ratio in which services are mapped to a landscape can be adjusted. For example, 50% of the services can be validated on a cheaper landscape while another landscape can be tested for only 25% of other services, and a third landscape can be tested for the rest 25% of the services. There can be other combinations and distributions of testing between multiple landscapes and distribution percentages that can be predefined for the testing.

In some implementations, landscape selection 285 for the services 275 can be made and the services can run over selected landscape types in a temporary test landscape 280. The landscape can be instantiated and set up based on the selection made at 285. In some implementations, one software product can be associated with the services to be tested, where based on the selection, the software product 1 can be executed over a landscape type X, while in productive mode, the software product 1 is running on a landscape type Y. The selection 285 of landscapes can be done over time and over the iterations scheduled for executing tests for services of a software project (e.g., source code, metadata, configurations related to a development project).

In response to defining the landscape selection, a set of infrastructure landscape types can be created. Each of the set of infrastructure landscape types that run as temporary test landscapes can be configured to run respective products from the set of products to be tested. In some instances, a product from the set can include one or more of the services 275 to be tested, where all the services 275 to be tested can be associated with one or more products.

In some implementations, once tests are executed and show successful execution of the respective services (e.g., meet a test output criteria) the set of products or services that were tested can be each deployed on a respective infrastructure landscape type on the cloud infrastructure landscape 270 in a productive lane of an infrastructure landscape type on the cloud infrastructure landscape. In some instances, the selected respective infrastructure landscape type for each product for testing can be different or the same as an infrastructure landscape type where the product is deployed on the cloud infrastructure landscape in the productive mode.

FIG. 3 is a flow diagram of a method 300 for the selection of tests for execution over services running in clusters on a cloud infrastructure in accordance with implementations of the present disclosure. In some implementations, the method 300 can be executed in a computing environment as described in relation to FIGS. 2A, 2B and 2C. The selection of tests for execution can be performed at a testing framework implementing a rule set to evaluate code changes and identify relevant tests for execution. The testing framework can be substantially similar to the testing framework 225 of FIG. 2A.

At 310, metadata of a set of changed files is obtained. The changed files are associated with a software product, for example, a service running in a cluster (e.g., Service A of cluster 210 of FIG. 2A). The changed files are filed that are to be deployed in a software product that can be provided in productive mode to end users. The changed files can be stored and maintained at a source code repository (e.g., Git®). In some implementations, the source code repository can be a version control system that tracks changes in files and can be used to coordinate work between users (e.g., developers) collaboratively working and changing files including source code of software projects during the software development phase.

In some instances, the metadata is obtained at 310 in response to detecting a change being made to the source code. The detection of the change can be performed by the source code repository. In some instances, the source code repository can provide the metadata in response to receiving the change in source code and/or the metadata associated with the software product.

At 320, the metadata of the set of changed files and content of at least one of the changed files is analyzed based on a rule set. In some implementations, the rule set can be substantially similar to the rule set 226 of FIG. 2A. The evaluation of the metadata is performed to determine a subset of tests of a default test plan to be executed. In some implementations, test plans can be defined for software products and/or for services that are part of a software product defined as a solution, including multiple services. The test plans can be defined per software product and may not be specifically divided for the separate services but rather configured as a test suite to be executed. In some cases, upon changes of some of the source files of a software product, only a subset of the tests may be necessary to be executed to target the changes of the files thus reducing the testing execution in time and reducing the load on the test infrastructure. In some instances, the evaluation of the metadata may also include a request for obtaining content of at least some of the changed files to evaluate the source code based on the rule set. In some instances, the evaluation of the metadata and the determination of the tests to be executed can be provided to a user to obtain user instruction for inclusion of additional flags or modifications to a test plan. For example, the user instructions can be received as additional input that can overwrite the rule set 226 used for the evaluation of the metadata.

In some implementations, the rule set can be defined as described in relation to FIG. 2A and can include rules to skip or enforce testing of portions of the software product based on identifying flags in changed portions of source code in the set of changed files. In some instances, the changes to the source code can be annotated with flags, where those flags can be iteratively evaluated to determine how to execute tests related to those changes. In some instances, the included flags in the source code can be added while the source code is changed by a developer.

At 330, the subset of tests is executed at a test landscape running a set of software components associated with the set of changed files. In some implementations, the execution of the subset of tests can include the creation of a test landscape that is a temporary landscape instantiated for the test execution. A set of instances of software components associated with the changed files in the software project can be provided and run at the temporary test landscape. The test landscape can be defined based on landscape-specific settings as a configuration. When a test is to be executed, the landscape-specific settings can be checked to determine whether one or more tests can or cannot be executed over the particular landscape. In this case, it can be determined that a test would not be possible to be executed over a particular test landscape, and that test landscape can be skipped for the particular test and other landscape(s) can be used.

In some implementations, the executed tests include unit tests that can be executed over portions of the software components associated with the change. Further, in some cases, integration tests can be executed, for example, in parallel for integrations between at least two of the software components. In some instances, the executed test-unit tests and/or integration tests—can be a part of the subset of the test as defined based on the rule set and can be part of a default test plan defined for products running on the cloud infrastructure.

In some implementations, when a test is to be executed, a landscape type can be determined for executing the test over a component of the set of software components. The landscape type can be selected from a set of landscape types that are defined for the testing. Each of the landscape types corresponds to a type of infrastructure for running the software component. In some instances, the test landscape is a cloud test landscape configured to host software components as a service.

At 340, test results are obtained from the executed tests. In some implementations, a test can be executed over a first product when the first product is running at a landscape that can be of a selected infrastructure landscape type. The selection of the landscape type can be performed with consideration of the load distribution of tests over various landscape types (e.g., different infrastructures providing resources for running services in a cloud environment). In some instances, the landscape types can be associated with different infrastructure providers and different technology specifics for the execution of services. In some instances, it can be determined that tests are executed at a landscape environment that includes at least two landscapes of different infrastructure types. In those cases, a component of the set of software components can be tested in parallel on the at least two landscapes. In some implementations, after the execution of the subset of tests at the test landscape, the test landscape can be deleted as the space can be used for other test landscapes for subsequent tests.

In some implementations, the obtained test results can be evaluated to determine the performance of the first product. In some cases, it can be determined that the test has failed. In those cases, the test execution needs to be continued. In some instances, based on the test results, further changes to the source code or configuration of the first product can be made. The new changes can be used to redeploy a new version of the first product to run new tests and obtain results that can show successful execution. In some implementations, the test execution and development tasks to improve the functionality can be performed in iterations until test results meet a status for successful execution (e.g., a threshold percentage (e.g., 90%, 95%, or 100%) of the executed test can yield a successful result).

At 350, it is determined to deploy the first product in productive mode on an infrastructure landscape type (e.g., a type defined based on the product definition, user specification, or obtained otherwise).

Figure 4:
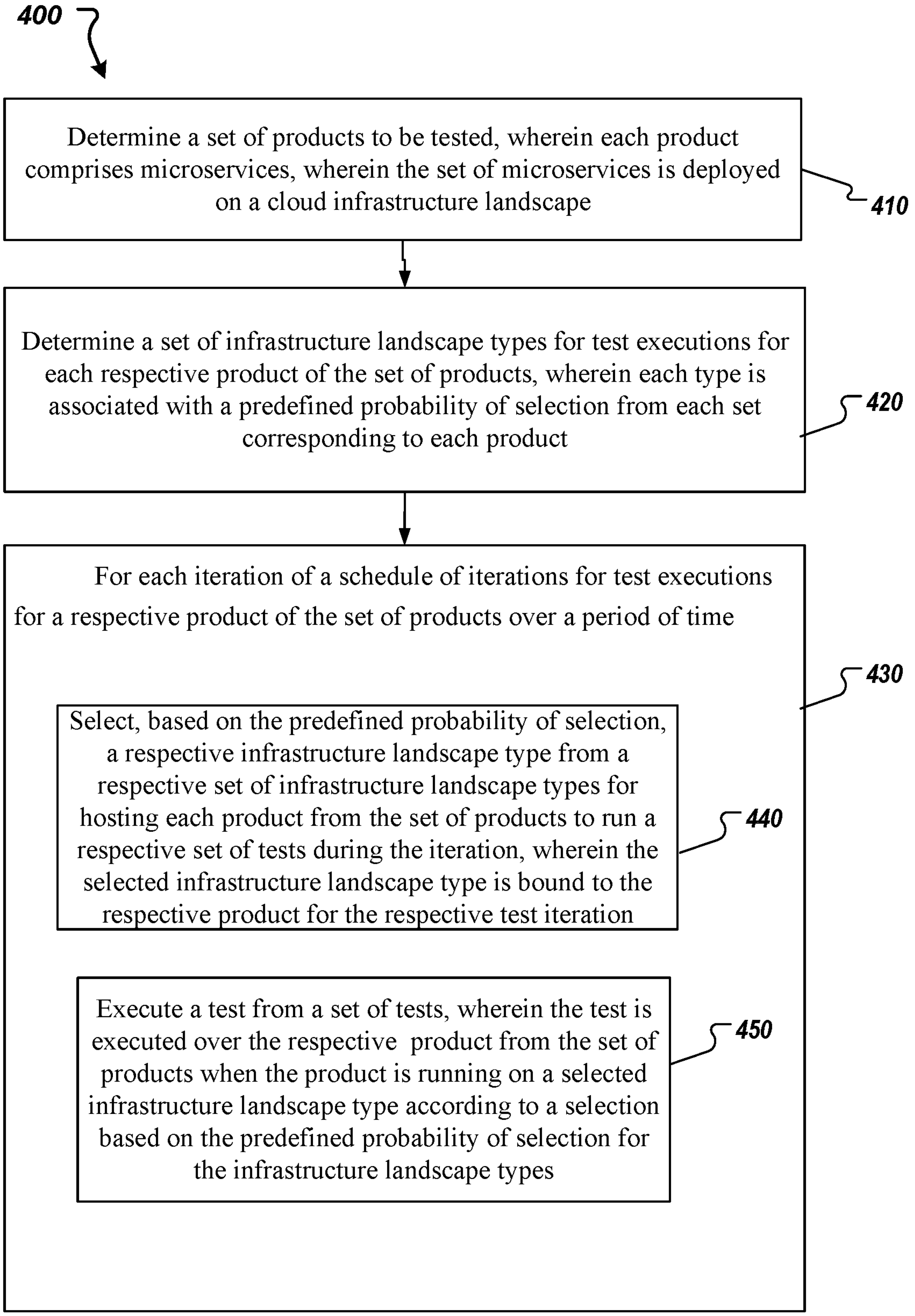
FIG. 4 is a flow diagram of a method for test load distribution in accordance with implementations of the present disclosure.

FIG. 4 is a flow diagram of a method 400 for test load distribution in accordance with implementations of the present disclosure. In some implementations, the method 400 can be executed in a cloud environment as described in relation to FIGS. 2A, 2B, and 2C. The method 400 can be executed when a test is to be executed for a component of a software product, where the test is determined for a particular change made in the source code associated with the component. In some implementations, the test that is to be executed and the relevant components for the test can be determined as described in relation to the method for the test selection of FIG. 3.

At 410, a set of products is determined to be tested. The products to be tested can be software products including cloud services as described in relation to FIGS. 2A, 2B, and 2C. In some instances, each product of the set includes a set of microservices. The set of microservices can be deployed on a cloud infrastructure landscape, such as the infrastructure 200 of FIG. 2A, the infrastructure 240 of FIG. 2B, or the infrastructure 270 of FIG. 2C.

In some implementations, the products that are relevant for testing can be determined based on received changes in the source code of the set of microservices. In some instances, a product can be defined as including one or more microservices that can be deployed to run in an integrated manner and provide resources to an end user. In some implementations, a set of microservices can be deployed at a productive landscape infrastructure of a given infrastructure landscape type of the set of infrastructure landscape types. The set of microservices can be tested when the set of microservices is deployed with their previous state and each service is updated to the changes state as defined in the change. In some instances, the update may be relevant only for a portion of the microservices. The change can be done in the source code of the set of microservices, which can change the performance of the set of products when providing services as deployed on the cloud infrastructure landscape.

The portion of the microservices associated with the change can be determined as described in relation to FIG. 2A and FIG. 3. Tests that are relevant for that portion of microservices can be determined according to a rule set to evaluate metadata associated with the changes as described in relation to FIGS. 2A, 2B, and 3.

At 420, a set of infrastructure landscape types is determined for test executions. The types are determined as associated with products that run on the infrastructure. The set of landscape types can be configured with probabilities for selection for each respective product. For example, each type can be associated with a predefined probability of selection for each product, where some types may be not available for one or more products (e.g., not supported for execution). For example, if there are two types of landscapes, such as the landscape X and landscape Y of FIG. 2C, each type can be associated with a 50% chance of selection that can provide even distribution between tests over the two types of landscapes, or each type can be associated with a different percentage defining different chances of selection of a landscape type for a given test execution. In some implementations, the defined probabilities for selection can be used during the scheduling of tests over periods of time, such as each month, a product can be associated with a particular landscape type based on a selection for a respective set of landscape types, where the distribution of tests for products over the set of types can still correspond to the configured probabilities as applied each month. Other definitions of time periods different from a month (e.g., day, week, 50 hours, etc.) would fall within the scope of the present implementations.

At 430, for each iteration of a schedule of iterations for test executions for a respective product of the set of products over a period of time (e.g., a month), the steps 440 and 450 are performed.

At 440, a respective infrastructure landscape type from the set of infrastructure landscape types is selected (based on the predefined probability of selection) for hosting the respective product from the set of products. The hosted product on the respective landscape type can be tested by running a respective set of tests during each iteration. The selected infrastructure landscape type can be bound to the respective product for the respective test iteration.

At 450, a test from a set of tests is executed at the running instance of the respective product. The test is executed over a first product from the set of products when the first product is running on a selected infrastructure landscape type according to a selection based on the predefined probability of selection for the infrastructure landscape types.

In some implementations, test results from the executed test over a sequence of iterations can be obtained. The test results are used to determine whether to deploy the first product on an infrastructure landscape type in productive mode.

In accordance with implementations of the present disclosures, sets of choices of types of landscapes can be defined for different products, where for each product there is a set where each type is defined with a respective probability of selection relevant for that product. In some instances, such sets of choices can be defined not only for a product, but also for a product when executed at a particular type of a lane, for example, associated with the development phase, testing, production, or else. In some implementations, a particular landscape type can be configured as irrelevant (or in a blacklist) for selection for a given product and thus such a landscape type may not be included in the respective set for that product or can be included and set with a probability of 0%. So a bucket is that choice list from which one needs to select one option. Each option comes with a chance.

Figure 5:
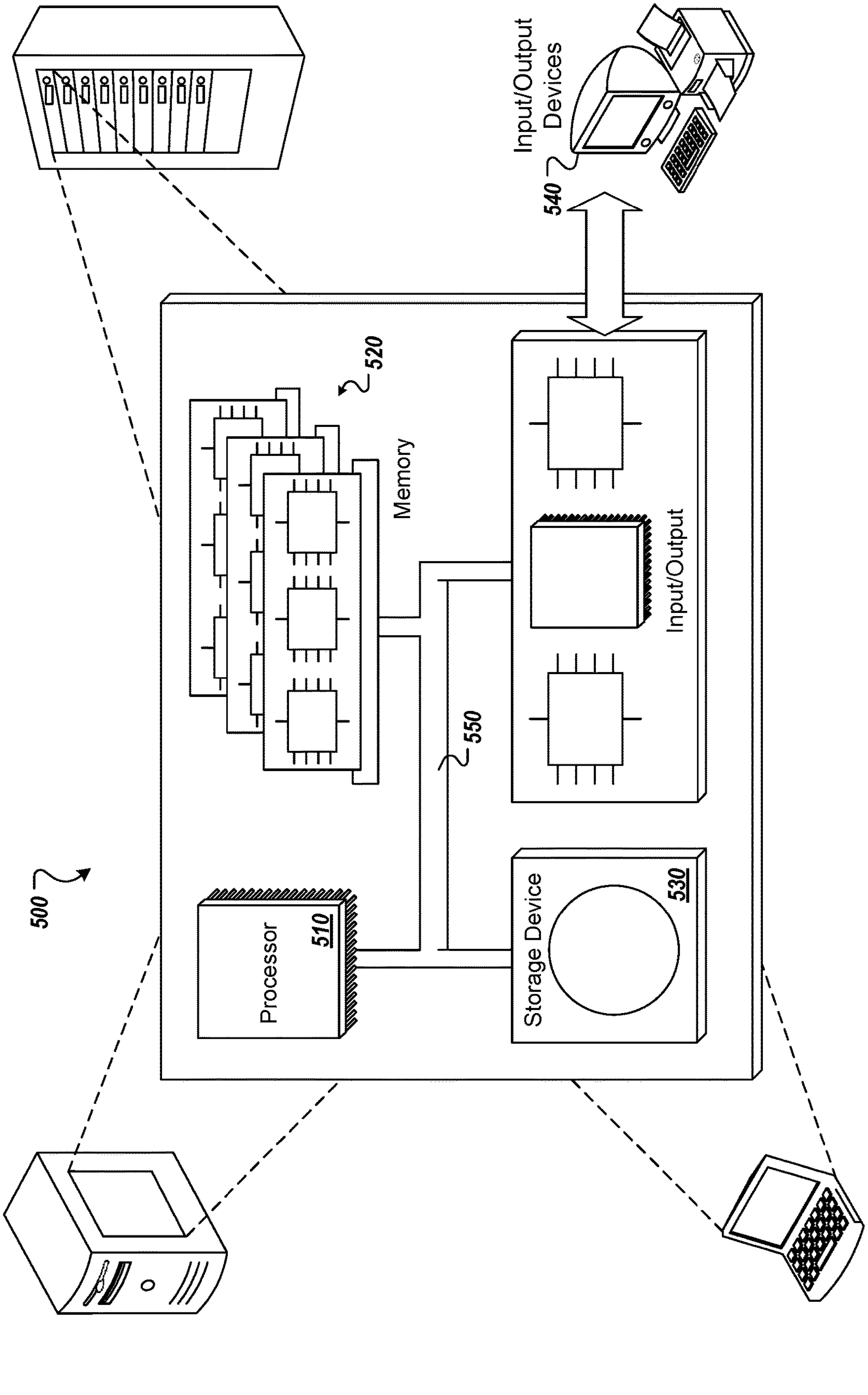
FIG. 5 is a schematic diagram of an example computer system that can be used to execute implementations of the present disclosure.

FIG. 5 is a schematic diagram of an example computer system 500 that can be used to execute implementations of the present disclosure. For example, the computer system 500 may be included in any or all of the server components discussed herein. The computer system 500 includes a processor 510, a memory 520, a storage device 530, and an input/output device 550. The components 510, 520, 530, and 550 are interconnected using a system bus 550. The processor 510 is capable of processing instructions for execution within the computer system 500. In some implementations, the processor 510 is a single-threaded processor. In some implementations, the processor 510 is a multi-threaded processor. The processor 510 is capable of processing instructions stored in the memory 520 or on the storage device 530 to display graphical information for a user interface on the input/output device 550.

The memory 520 stores information within the computer system 500. In some implementations, the memory 520 is a computer-readable medium. In some implementations, the memory 520 is a volatile memory unit. In some implementations, the memory 520 is a non-volatile memory unit. The storage device 530 is capable of providing mass storage for the system 500. In some implementations, the storage device 530 is a computer-readable medium. In some implementations, the storage device 530 may be a floppy disk device, a hard disk device, an optical disk device, or a tape device. The input/output device 550 provides input/output operations for the computer system 500. In some implementations, the input/output device 550 includes a keyboard and/or pointing device. In some implementations, the input/output device 550 includes a display unit for displaying graphical user interfaces.

The features described can be implemented in digital electronic circuitry, or in computer hardware, firmware, software, or combinations of them. The apparatus can be implemented in a computer program product tangibly embodied in an information carrier (for example, in a machine-readable storage device, for execution by a programmable processor), and method operations can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or another unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory, or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as sPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a cathode ray tube (CRT) or liquid crystal display (LCD) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship between client and server arises by virtue of computer programs running on the respective computers and having a client-server relationship with each other.

In addition, the logic flows depicted in the figures do not require the particular order shown, or sequential order, to achieve desirable results. In addition, other operations may be provided, or operations may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

In view of the above described implementations of subject matter, this application discloses the following list of examples, wherein one feature of an example in isolation or more than one feature of said example taken in combination and, optionally, in combination with one or more features of one or more further examples are further examples also falling within the disclosure of this application.

EXAMPLES

Although the present application is defined in the attached claims, it should be understood that the present invention can also be (alternatively) defined in accordance with the following examples:

Test Framework Supporting Precise Selection of Tests for Microservice in a Cloud Environment Example 1. A computer implemented method, the method comprising:

- obtaining metadata of a set of changed files, wherein the set of changed files is to be deployed in a software product and is stored at a source code repository;
- analyzing, based on a rule set, the metadata of the set of changed files and content of at least one of the changed files to determine a subset of tests of a default test plan to be executed; and
- executing the subset of tests at a test landscape running a set of software components associated with the set of changed files.

Example 2. The method of Example 1, wherein obtaining the metadata of the set of changed files is performed in response to detecting a change by the source code repository, wherein the obtaining comprises:

- analyzing metadata obtained from the source code repository, wherein the source code repository provides the metadata in response to receiving the change in source code and/or the metadata associated with the software product; and
- wherein the method comprises:
  - obtaining the content of the at least one of the changed files to evaluate the change in the source code based on the rule set.

Example 3. The method of any of the preceding Examples, the method comprising:

- defining the rule set to include rules to skip or enforce testing of portions of the software product based on identifying flags in changed portions of source code in the set of changed files.

Example 4. The method of any of the preceding Examples, wherein executing the subset of tests comprises:

- creating the test landscape as a temporary landscape; and
- providing a set of instances of the set of software components associated with the set of changed files.

Example 5. The method of Example 4, wherein executing the subset of tests further comprises:

- updating the test landscape by updating the set of instances by executing changes associated with the set of changed files to put the set of instances in an updated state after the change.

Example 6. The method of any of the preceding Examples, wherein after the execution of the subset of tests at the test landscape, deleting the test landscape.

Example 7. The method of any of the preceding Examples, wherein executing the subset of tests comprises:

- executing unit tests over portions of the software components, and
- executing integration tests in parallel between at least two of the software components,
- wherein the unit tests and the integrations tests are identified as part of the subset of tests based on the rule set.

Example 8. The method of any of the preceding Examples, wherein executing the subset of tests comprises:

determining a landscape type for executing a test over a component of the set of software components, wherein a set of landscape types are defined for the testing, wherein each of the landscape types corresponds to a type of infrastructure for running the software component.

Example 9. The method of any of the preceding Examples, wherein the test landscape is a cloud test landscape configured to host software components as a service.

Example 10. The method of any of the preceding Examples, wherein the test landscape comprises at least two landscapes of different infrastructure types, wherein a component of the set of software components is tested in parallel on the at least two landscapes.

Example 11. A system comprising:

one or more processors; and one or more computer-readable memories coupled to the one or more processors and having instructions stored thereon that are executable by the one or more processors to perform the method of any of Examples 1 to 10.

Example 12: A non-transitory, computer-readable medium coupled to one or more processors and having instructions stored thereon which, when executed by the one or more processors, cause the one or more processors to perform the method of any of Examples 1 to 10.

Test Load Distribution Over Landscape Types in a Cloud Infrastructure

Example 1. A computer implemented method, the method comprising:

determining a set of products to be tested, wherein each product comprises a set of microservices, wherein the set of microservices is deployed on a cloud infrastructure landscape;

determining a set of infrastructure landscape types for test executions for each respective product of the set of products, wherein each type is associated with a predefined probability of selection from each set corresponding to each product; and for each iteration of a schedule of iterations for test executions for a respective product of the set of products over a period of time:

selecting, based on the predefined probability of selection, a respective infrastructure landscape type from a respective set of infrastructure landscape types for hosting each product from the set of products to run a respective set of tests during the iteration, wherein the selected infrastructure landscape type is bound to the respective product for the respective test iteration, and executing a test from a set of tests, wherein the test is executed over the respective product from the set of products when the product is running on a selected infrastructure landscape type according to a selection based on the predefined probability of selection for the infrastructure landscape types.

Example 2. The method of Example 1, the method comprising:

determining the set of products to be tested based on received changes in the source code of the set of microservices, wherein the set of microservices are deployed at a productive landscape infrastructure of a given infrastructure landscape type of the set of infrastructure landscape types.

Example 3. The method of any of the preceding Examples, wherein the set of products includes services associated with changes in the source code of the set of microservices, wherein the changes alter a performance of the set of products when providing services as deployed on the cloud infrastructure landscape.

Example 4. The method of any of the preceding Examples, further comprising;

in response to executing the test over a first product when the first product is running on the selected infrastructure landscape type, obtaining test results from the execution;

evaluating the test results to determine performance of the first product; and in response to determining that the test has failed, executing an update for the first product based on modifications defined based on the failed test and continuing to execute testing of the first product as updated while running tests again on the selected infrastructure landscape type until new test results show successful execution.

Example 5. The method of any of the preceding Examples, wherein the set of products is deployed on a respective set of different infrastructure landscape type on the cloud infrastructure landscape in a respective set of productive lane of a respective infrastructure landscape type on the cloud infrastructure landscape, and wherein the selected respective infrastructure landscape type for each product for testing is different from an infrastructure landscape type where the product is deployed on the cloud infrastructure landscape in the productive mode.

Example 6. The method of any one of the preceding Examples, wherein during each of the iterations of the schedule:

creating the set of infrastructure landscape types; and updating each of the set of infrastructure landscape types to change respective microservices from the set of microservices to be tested.

Example 7. The method of any one of the preceding Examples, further comprising:

obtaining test results from the executed test over a sequence of iterations, wherein the test results are used to determine whether to deploy the respective change on an infrastructure landscape type in productive mode.

Example 8. A system comprising:

one or more processors; and one or more computer-readable memories coupled to the one or more processors and having instructions stored thereon that are executable by the one or more processors to perform the method of any of Examples 1 to 7.

Example 9: A non-transitory, computer-readable medium coupled to one or more processors and having instructions stored thereon which, when executed by the one or more processors, cause the one or more processors to perform the method of any of Examples 1 to 7.

What is claimed is:

1. A computer implemented method, the method comprising:

determining a set of products to be tested, wherein each product comprises a set of microservices, wherein the set of microservices is deployed on a cloud infrastructure landscape;

determining a set of infrastructure landscape types for test executions for each respective product of the set of products, wherein each infrastructure landscape type is associated with a predefined probability of selection from each set of infrastructure landscape types corresponding to each product; and for each iteration of a schedule of iterations for test executions for a respective product of the set of products over a period of time:

selecting, based on the predefined probability of selection, an infrastructure landscape type from a set of infrastructure landscape types relevant for hosting each product from the set of products to run a respective set of tests over the respective product during the respective iteration, wherein the selected infrastructure landscape type is bound to the respective product for the respective iteration, executing a set of tests associated with a first product of the set of products over the first product running on the selected infrastructure landscape type; and in response to determining that the set of tests has failed, executing a deployment of a change to the first product in production mode of the cloud landscape infrastructure of the selected infrastructure landscape type, the change being determined based on test results obtained test results from executing the set of tests.

2. The method of claim 1, the method comprising:

determining the set of products to be tested based on evaluating changes in source code of the set of microservices, wherein the set of microservices are deployed at production modes of the cloud landscape infrastructure of respective infrastructure landscape types of the set of infrastructure landscape types.

3. The method of claim 1, wherein the set of products includes services associated with changes in source code of the set of microservices, wherein the changes alter a performance of the set of products when providing services as deployed on the cloud infrastructure landscape.

4. The method of claim 1, further comprising:

executing a test over the first product when the first product is running on the selected infrastructure landscape type to provide initial test results;

evaluating the initial test results to determine performance of the first product; and determining that the test has failed; and continuing to execute testing of the first product as updated based on the change while running the test again on the selected infrastructure landscape type until new test results show successful execution.

5. The method of claim 1, wherein the set of products is deployed on a respective set of different infrastructure landscape type on the cloud infrastructure landscape in a respective set of productive lanes of a respective infrastructure landscape type on the cloud infrastructure landscape, and wherein the selected respective infrastructure landscape type for each product for testing is different from an infrastructure landscape type where the product is deployed on the cloud infrastructure landscape in a respective productive lane.

6. The method of claim 1, wherein during each of the iterations of the schedule:

creating the set of infrastructure landscape types; and updating each of the set of infrastructure landscape types to run the set of products to be tested.

7. A system comprising:

one or more processors; and one or more computer-readable memories coupled to the one or more processors and having instructions stored thereon that are executable by the one or more processors to perform operations comprising:

determining a set of products to be tested, wherein each product comprises a set of microservices, wherein the set of microservices is deployed on a cloud infrastructure landscape;

determining a set of infrastructure landscape types for test executions for each respective product of the set of products, wherein each infrastructure landscape type is associated with a predefined probability of selection from each set of infrastructure landscape types corresponding to each product; and for each iteration of a schedule of iterations for test executions for a respective product of the set of products over a period of time:

selecting, based on the predefined probability of selection, an infrastructure landscape type from a set of infrastructure landscape types relevant for hosting each product from the set of products to run a respective set of tests over the respective product during the respective iteration, wherein the selected infrastructure landscape type is bound to the respective product for the respective iteration, executing a set of tests associated with a first product of the set of products over the first product running on the selected infrastructure landscape type; and in response to determining that the set of tests has failed, executing a deployment of a change to the first product in production mode of the cloud landscape infrastructure of the selected infrastructure landscape type, the change being determined based on test results obtained test results from executing the set of tests.

8. The system of claim 7, wherein the one or more computer-readable memories has instructions stored thereon that are executable by the one or more processors to perform operations comprising:

determining the set of products to be tested based on evaluating changes in source code of the set of microservices, wherein the set of microservices are deployed at production modes of the cloud landscape infrastructure of respective infrastructure landscape types of the set of infrastructure landscape types.

9. The system of claim 7, wherein the set of products includes services associated with changes in source code of the set of microservices, wherein the changes alter a performance of the set of products when providing services as deployed on the cloud infrastructure landscape.

10. The system of claim 7, wherein the one or more computer-readable memories has instructions stored thereon that are executable by the one or more processors to perform further operations comprising:

executing a test over the first product when the first product is running on the selected infrastructure landscape type to provide initial test results;

evaluating the initial test results to determine performance of the first product; and determining that the test has failed; and continuing to execute testing of the first product as updated based on the change while running the test again on the selected infrastructure landscape type until new test results show successful execution.

11. The system of claim 7, wherein the set of products is deployed on a respective set of different infrastructure landscape type on the cloud infrastructure landscape in a respective set of productive lanes of a respective infrastructure landscape type on the cloud infrastructure landscape, and wherein the selected respective infrastructure landscape type for each product for testing is different from an infrastructure landscape type where the product is deployed on the cloud infrastructure landscape in a respective productive lane.

12. The system of claim 7, wherein during each of the iterations of the schedule:

creating the set of infrastructure landscape types; and updating each of the set of infrastructure landscape types to run the set of products to be tested.

13. A non-transitory, computer-readable medium coupled to one or more processors and having instructions stored thereon which, when executed by the one or more processors, cause the one or more processors to perform operations comprising:

determining a set of products to be tested, wherein each product comprises a set of microservices, wherein the set of microservices is deployed on a cloud infrastructure landscape;

determining a set of infrastructure landscape types for test executions for each respective product of the set of products, wherein each infrastructure landscape type is associated with a predefined probability of selection from each set of infrastructure landscape types corresponding to each product; and for each iteration of a schedule of iterations for test executions for a respective product of the set of products over a period of time:

selecting, based on the predefined probability of selection, an infrastructure landscape type from a set of infrastructure landscape types relevant for hosting each product from the set of products to run a respective set of tests over the respective product during the respective iteration, wherein the selected infrastructure landscape type is bound to the respective product for the respective iteration, executing a set of tests associated with a first product of the set of products over the first product running on the selected infrastructure landscape type; and in response to determining that the set of tests has failed, executing a deployment of a change to the first product in production mode of the cloud landscape infrastructure of the selected infrastructure landscape type, the change being determined based on test results obtained test results from executing the set of tests.

14. The non-transitory, computer-readable medium of claim 13, comprising instructions stored thereon that are executable by the one or more processors to perform operations comprising:

determining the set of products to be tested based on evaluating changes in source code of the set of microservices, wherein the set of microservices are deployed at production modes of the cloud landscape infrastructure of respective infrastructure landscape types of the set of infrastructure landscape types.

15. The non-transitory, computer-readable medium of claim 13, wherein the set of products includes services associated with changes in source code of the set of microservices, wherein the changes alter a performance of the set of products when providing services as deployed on the cloud infrastructure landscape.

16. The non-transitory, computer-readable medium of claim 13, comprising instructions stored thereon that are executable by the one or more processors to perform operations comprising:

executing a test over the first product when the first product is running on the selected infrastructure landscape type to provide initial test results;

evaluating the initial test results to determine performance of the first product; and determining that the test has failed; and continuing to execute testing of the first product as updated based on the change while running the test again on the selected infrastructure landscape type until new test results show successful execution.

17. The non-transitory, computer-readable medium of claim 13, wherein the set of products is deployed on a respective set of different infrastructure landscape type on the cloud infrastructure landscape in a respective set of productive lanes of a respective infrastructure landscape type on the cloud infrastructure landscape, and wherein the selected respective infrastructure landscape type for each product for testing is different from an infrastructure landscape type where the product is deployed on the cloud infrastructure landscape in a respective productive lane.

18. The non-transitory, computer-readable medium of claim 13, wherein during each of the iterations of the schedule:

creating the set of infrastructure landscape types; and updating each of the set of infrastructure landscape types to run the set of products to be tested.

* * * * *